US009989648B2

(12) United States Patent
Tomii et al.

(10) Patent No.: US 9,989,648 B2
(45) Date of Patent: Jun. 5, 2018

(54) ELECTRONIC DEVICE AND RECEPTION CONTROL METHOD

(71) Applicant: Seiko Epson Corporation, Shinjuku-ku (JP)

(72) Inventors: Takuya Tomii, Nagano (JP); Reiko Sato, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 876 days.

(21) Appl. No.: 14/516,448

(22) Filed: Oct. 16, 2014

(65) Prior Publication Data

US 2015/0102961 A1 Apr. 16, 2015

(30) Foreign Application Priority Data

Oct. 16, 2013 (JP) ................. 2013-215264

(51) Int. Cl.
*G01S 19/34* (2010.01)
*G01S 19/19* (2010.01)

(52) U.S. Cl.
CPC .............. *G01S 19/34* (2013.01); *G01S 19/19* (2013.01)

(58) Field of Classification Search
CPC ................... G01S 19/34; G01S 19/19
See application file for complete search history.

(56) References Cited

U.S. PATENT DOCUMENTS

| 5,905,460 | A | 5/1999 | Odagiri et al. |
| 6,426,719 | B1 | 7/2002 | Nagareda et al. |
| 2004/0192352 | A1* | 9/2004 | Vallstrom ............... G01S 19/34 455/456.6 |
| 2005/0113124 | A1* | 5/2005 | Syrjarinne ............... G01S 19/34 455/522 |
| 2006/0119508 | A1* | 6/2006 | Miller .................... G01S 19/34 342/357.77 |
| 2008/0030403 | A1 | 2/2008 | Honda et al. |
| 2009/0135674 | A1 | 5/2009 | Matsuzaki |
| 2009/0278741 | A1 | 11/2009 | Miyata |
| 2011/0175772 | A1 | 7/2011 | Sambongi |
| 2013/0052944 | A1 | 2/2013 | Baba et al. |
| 2013/0314279 | A1 | 11/2013 | Shen et al. |

FOREIGN PATENT DOCUMENTS

| JP | 08-327718 A | 12/1996 |
| JP | 2009-270929 A | 11/2009 |
| JP | 2011-164089 A | 8/2011 |
| WO | 2012/102221 A1 | 8/2012 |

OTHER PUBLICATIONS

European search report, dated Mar. 27, 2015, of the corresponding European Application No. 14188780.2.

* cited by examiner

*Primary Examiner* — Bernarr E Gregory
*Assistant Examiner* — Fred H Mull
(74) *Attorney, Agent, or Firm* — Kilpatrick Townsend & Stockton LLP

(57) ABSTRACT

An electronic device includes: a satellite signal receiving section that receives a satellite signal with which positioning information is overlapped from a positioning satellite; a reception control section that controls driving of the satellite signal receiving section; and a detecting section that detects a state change of the electronic device, in which the reception control section allows the satellite signal receiving section to enter a driving state when the detecting section detects the state change to receive the satellite signal. According to this electronic device, it is possible to reduce a TTFF at the positioning start, and to reduce power consumption in the satellite signal reception.

6 Claims, 8 Drawing Sheets

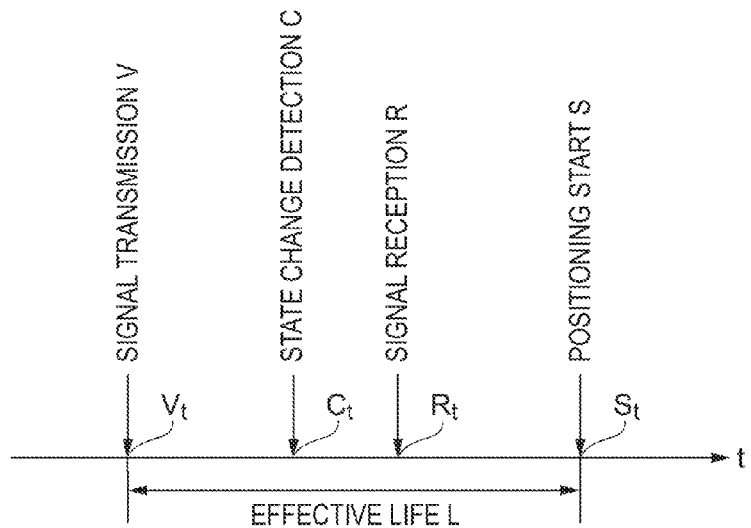

FIG. 2

| STATE CHANGE TARGET | DETECTION METHOD | ADDITIONAL CONDITION |
|---|---|---|
| POWER-ON | POWER BUTTON DETECTION | ONE MINUTE AFTER |
| | | FIVE MINUTES AFTER |
| HOME SCREEN SWITCHING | OPERATION BUTTON A DETECTION | ONE MINUTE AFTER |
| | | FIVE MINUTES AFTER |
| COMMUNICATION END | COMMUNICATION END DETECTION | ONE MINUTE AFTER |
| | | FIVE MINUTES AFTER |
| CHARGING END | CHARGING TERMINAL DISCONNECTION DETECTION | ONE MINUTE AFTER |
| | | FIVE MINUTES AFTER |
| CHARGING START | CHARGING TERMINAL CONNECTION DETECTION | NONE |

FIG. 3

| STATE CHANGE TARGET | DETECTION METHOD | ADDITIONAL CONDITION |
|---|---|---|
| ACCELERATION | DETECTION AFTER DISTANCE CALCULATION | 5m |
| | | 10m |
| WEARING PRESSURE | PRESSURE FORCE DETECTION | WEARING |
| | | DETACHMENT |
| ILLUMINANCE | IRRADIATION ILLUMINANCE DETECTION (0 TO 255) | 50(INDOOR) |
| | | 100(OUTDOOR: CLOUDY) |
| | | 200(OUTDOOR: FINE) |

FIG. 4

| SUPPRESSION TARGET | ADDITIONAL CONDITION |
|---|---|
| PREVIOUS EPHEMERIS OBTAINMENT SUCCESS | DURING 60 MINUTES |
| DURING RECEPTION | – |
| DURING POSITIONING | – |

FIG. 5

| STATE CHANGE TARGET | DETECTION METHOD | ADDITIONAL CONDITION | P(R/C) |
|---|---|---|---|
| POWER-ON | POWER BUTTON DETECTION | ONE MINUTE AFTER | 0.20 |
| | | FIVE MINUTES AFTER | 0.35 |
| HOME SCREEN SWITCHING | OPERATION BUTTON A DETECTION | ONE MINUTE AFTER | 0.09 |
| | | FIVE MINUTES AFTER | 0.11 |
| COMMUNICATION END | COMMUNICATION END DETECTION | ONE MINUTE AFTER | 0.12 |
| | | FIVE MINUTES AFTER | 0.12 |
| CHARGING END | CHARGING TERMINAL DISCONNECTION DETECTION | ONE MINUTE AFTER | 0.18 |
| | | FIVE MINUTES AFTER | 0.22 |
| CHARGING START | CHARGING TERMINAL CONNECTION DETECTION | NONE | – |

FIG.10

ELECTRONIC DEVICE AND RECEPTION CONTROL METHOD

BACKGROUND

1. Technical Field

The present invention relates to an electronic device that receives a satellite signal from a positioning satellite to perform positioning, and a reception control method thereof.

2. Related Art

A technique that increases an opportunity to obtain positioning information about an ephemeris or the like included in a satellite signal transmitted from a global navigation satellite system (GNSS) satellite to reduce time to first fix (TTFF, time from when power of a satellite signal receiver is turned on to when position information is output) is known. Since the positioning information has an effective life, in order to perform accurate positioning in a positioning device, it is necessary to maintain positioning information of which the effective life is not expired. In a device disclosed in JP-A-2009-270929 mentioned below, a satellite signal is received from a GNSS satellite for a predetermined time before an effective life of maintained positioning information is expired to obtain positioning information again.

However, in the technique disclosed in JP-A-2009-270929, when the device is disposed at a place that a satellite signal does not reach, for example, in a room and is left as it is, the reception of the satellite signal fails, and thereafter, the obtainment is attempted again every predetermined time to repeat the failure. Further, when the device is left at a place that the satellite signal reaches, the reception of the satellite signal succeeds every predetermined time to obtain the positioning information. However, the latest positioning information is effective, but the previously obtained information is not effective for use.

In this way, when the device is left, the reception process is performed to repeat the failure every predetermined time, or to obtain the positioning information that is not used. When the device is operated by driving power of a portable battery, power consumption of the reception process is wasteful, and thus, there is a problem in that a user cannot use the device for a sufficient time due to lack of the battery residual when the user desires to use the device for positioning.

SUMMARY

An advantage of some aspects of the invention is to provide an electronic device capable of reducing a TTFF at the start of positioning and reducing power consumption due to satellite signal reception, and a control method for realizing the electronic device.

Application Example 1

An electronic device according to this application example includes: a receiving section that receives a satellite signal with which positioning information is overlapped from a positioning satellite; a control section that controls driving of the receiving section; and a detecting section that detects a state change of the electronic device, in which the control section allows the receiving section to enter a driving state when the detecting section detects the state change.

According to this application example, since the detecting section that detects the state change in the electronic device is provided, it is possible to detect a state change of leaving and non-leaving in the electronic device. Further, since the receiving section enters the driving state when the state change is detected, in the leaving state before the state change is detected, the receiving section is not driven, and thus, the satellite signal cannot be received. Further, if the state change is detected, the change to the non-leaving state is captured, and the receiving section is driven to receive the satellite signal. With the configuration in which the satellite signal is not received, while the electronic device is being left, it is possible to prevent the waste of power consumption due to the reception process. Further, since the reception of the satellite signal is performed by the change to the non-leaving state to obtain the positioning information including an ephemeris, when the user starts the positioning thereafter, the positioning can be started using the maintained positioning information.

Accordingly, it is possible to provide an electronic device capable of reducing the TTFF at the time of the positioning start and reducing power consumption due to the satellite signal reception.

Application Example 2

It is preferable that the state change includes at least one of power-on of the electronic device, screen-switching of the electronic device, communication end of the electronic device, and charging start of the electronic device.

The content of the state change according to this application example represents operations performed by the user before the time of the positioning start. By detecting these operations, it is possible to capture the opportunity before the positioning start, and to receive the satellite signal to obtain the positioning information. At the positioning start, the TTFF is reduced.

Application Example 3

It is preferable that the electronic device includes at least one of an acceleration sensor that outputs movement information of the electronic device, a wearing pressure sensor that outputs wearing state information of the electronic device, and an illuminance sensor that outputs environmental illuminance information of the electronic device, and in which the detecting section detects the state change based on the acceleration information, the wearing state information, or the environmental illuminance information.

According to this application example, the electronic device includes various sensors that output information for capturing an external environment. In the wearing state information, wearing of the electronic device by the user can be detected as the state change; in the acceleration information, the movement distance of the user can be detected as the state change; and in the environmental illuminance information, the movement from the indoor to the outdoor in the daytime can be detected as the state change. By detecting the behaviors of the user, it is possible to capture an opportunity that the user moves outdoors. Since the satellite signal easily reaches the outdoor environment compared with the indoor environment, a possibility of succeeding in the reception of the satellite signal is high.

Accordingly, since a state where the reception success rate of the satellite signal is high is detected to receive the satellite signal, it is possible to obtain the positioning information by a small number of receptions. Thus, the power consumption of the reception process before the positioning start is reduced.

Application Example 4

It is preferable that when the state change is detected and a reception suppressing condition for controlling reception of the satellite signal is satisfied, the control section does not allow the receiving section to enter the driving state.

According to this application example, even when the detection of the state change frequently occurs, the reception is limited to a necessary number of receptions by the reception suppressing condition. Thus, the receiving section does not frequently enter the driving state, and thus, the power consumption is reduced.

Application Example 5

It is preferable that the positioning information includes ephemeris information and almanac information.

According to this application example, by obtaining the positioning information, the positioning start state becomes a hot start.

Application Example 6

It is preferable that the control section allows the receiving section to enter the driving state when a reception success rate of the satellite signal recorded for each state change exceeds a predetermined success rate.

According to this application example, when the user has a fixed behavior pattern, the reception success rate for the state change highly related to the behavior pattern increases. When the state change in which the recorded reception success rate exceeds the predetermined success rate occurs, a possibility of succeeding in the satellite signal reception is high. Thus, it is possible to obtain the positioning information with a small number of receptions, and thus, the power consumption of the reception process is reduced.

Further, in the case of the state change in which the recorded reception success rate is lower than or equal to the predetermined success rate, the possibility of the reception success is low. When such a state change occurs, the satellite signal reception process may not be performed. Thus, the reception process of the satellite signal having a high possibility of failing in the reception is not performed, and thus, the power consumption can be reduced.

Application Example 7

A reception control method according to this application example is executed by an electronic device that calculates position information of the electronic device, and includes: receiving a satellite signal with which position information is overlapped from a positioning satellite; controlling start and stop of the receiving; and detecting a state change of the electronic device, in which in the controlling, when the state change is detected in the detecting, the receiving is started to receive the satellite signal.

According to this application example, since the detection process of detecting the state change of the electronic device is provided, it is possible to detect the change from a leaving state of the electronic device to a non-leaving state thereof. Further, since the satellite signal is received when the state change is detected, the control can be performed so that the satellite signal is not received in the leaving state, and the configuration can be made so that the satellite signal is received in the change to the non-leaving state. In this way, with the configuration in which the satellite signal is not received in the leaving state, it is possible to reduce the power consumption of the reception process. Further, since the reception of the satellite signal is performed according to the change to the non-leaving state to obtain the positioning information including the ephemeris, when the user starts the positioning thereafter, it is possible to reduce the TTFF using the positioning information.

BRIEF DESCRIPTION OF THE DRAWINGS

The invention will be described with reference to the accompanying drawings, wherein like numbers reference like elements.

FIG. 2 is a diagram illustrating processes up to a positioning start in a time series manner.

FIG. 3 is a diagram illustrating an example of a state change due to an operation.

FIG. 4 is a diagram illustrating an example of a state change due to a sensor.

FIG. 5 is a diagram illustrating an example of a reception suppressing condition.

FIG. 10 is a diagram illustrating an example of a state change according to Modification Example 2.

DESCRIPTION OF EXEMPLARY EMBODIMENTS

Hereinafter, an example of preferred embodiments to which the invention is applied will be described. In these embodiments, for example, a runner's watch 10 is used as an electronic device. In the following description, the invention is not limited to these embodiments as long as there is no disclosure that limits the invention.

1. RUNNER'S WATCH AND GNSS SATELLITE 1-1. Overview

Figure 1:
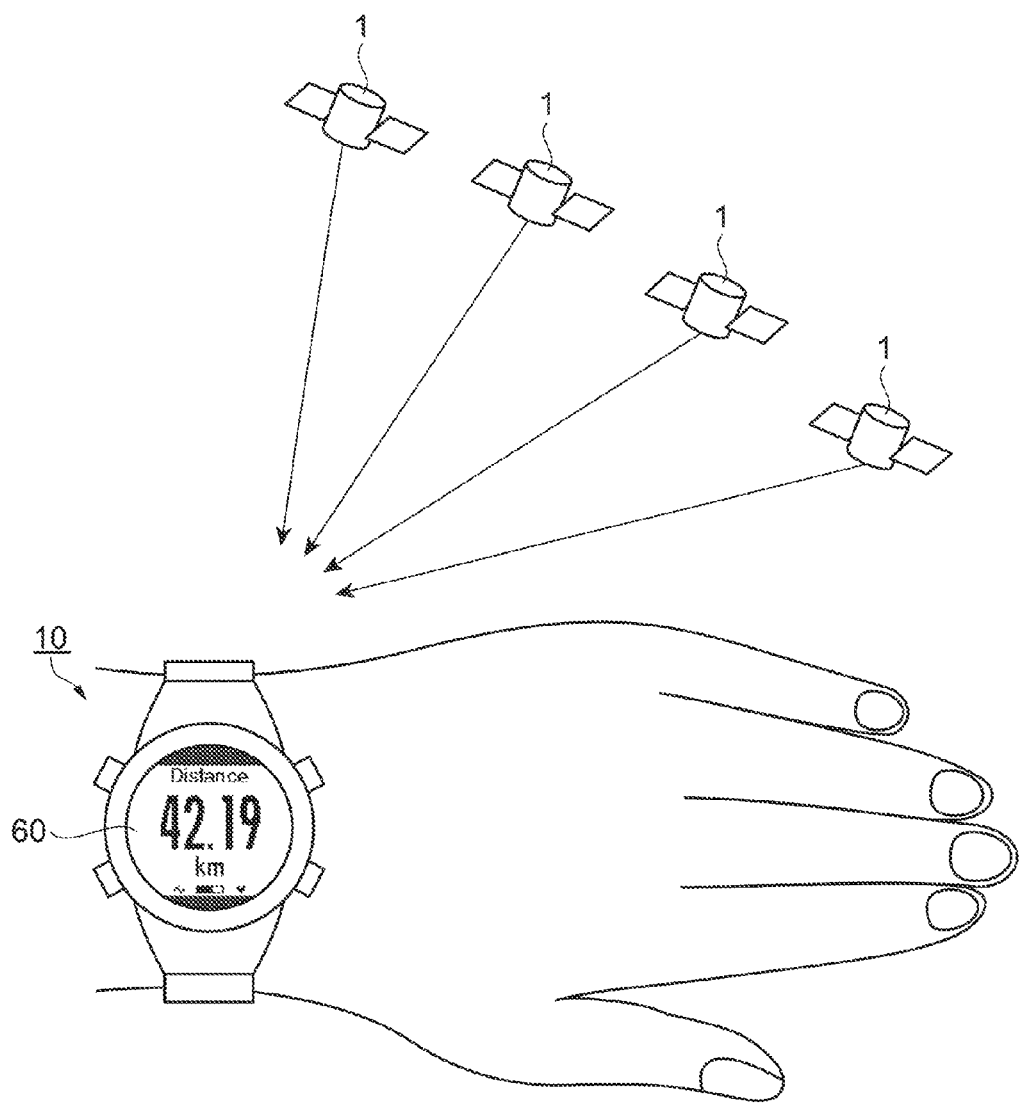
FIG. 1 is a diagram illustrating an outline of a runner's watch.

FIG. 1 is a diagram illustrating an outline of a runner's watch. A runner's watch 10 is a wrist-watch type electronic device that is worn on a user's arm and is used for positioning. The runner's watch 10 receives satellite signals transmitted from GNSS satellites 1 to obtain positioning information included in the satellite signals. If a positioning start is requested by an operation of a user, the runner's watch 10 is operated so that power of a receiving section that receives the satellite signals is turned on, to start the reception of the satellite signals. The runner's watch 10 sequentially calculates position information (position information about the user) of the runner's watch 10 itself during movement using the positioning information obtained from the satellite signals. The runner's watch 10 includes a display section 60 that displays a character, an icon or the like on a surface opposite to a surface being in contact with the arm. Further, the runner's watch 10 may calculate information about movement situations such as a movement distance from the position of the positioning start and a movement speed based on the calculated position information, and may display the contents in the display section 60 or may store the movement information in a storage section.

The user may adjust a user's own pace of running or the like with reference to the displayed information.

1-2. GNSS Satellite

A GNSS satellite 1 is a positioning satellite launched from around the world, and for example, is represented as Global Positioning System (GPS) in USA, Galileo in European Union, Quasi Zenith Satellite System (QZSS) in Japan, or the like. From each GNSS satellite 1, a satellite signal in which a navigation message is overlapped is transmitted toward the earth. The navigation message includes positioning information necessary for positioning.

The GNSS satellite 1 is mounted with an atomic clock, and the satellite signal includes extremely accurate time information counted by the atomic clock. The runner's watch 10 corrects an internal time of the runner's watch 10 using the accurate time information obtained from the satellite signal.

1-3. Position Calculation Method

When receiving the satellite signal transmitted from the GNSS satellite 1, the runner's watch 10 measures signal propagation time of the satellite signal from the time when the satellite signal is transmitted to the time when the satellite signal is received, and calculates a pseudo distance between the runner's watch 10 and the GNSS satellite 1 by multiplying the measured propagation time by the speed of light. By obtaining an accurate time of the GNSS satellite 1 at the time when the satellite signal is transmitted and position information thereof, the position on the earth that keeps the distance from the GNSS satellite 1 is narrowed down. By receiving satellite signals by the same procedure from three GNSS satellites 1, three-dimensional position information about the earth is specified. In reality, since the pseudo distance includes a time error, generally, satellite signals are obtained from four or more GNSS satellites 1 in consideration of a variable of the time error. Further, in an actual environment, due to the influence of multipath, a calculation error of the pseudo distance, or the like, the number of the GNSS satellites 1 from which the satellite signals are received is further increased to obtain the positioning information, so that the position calculation is performed with high accuracy.

1-4. Positioning Information: Almanac and Ephemeris

In order to calculate the position of the runner's watch 10, it is necessary to select four or more GNSS satellites 1 and to obtain accurate position information of the respective GNSS satellites 1. The navigation message that is overlapped with the satellite signal transmitted from the GNSS satellite 1 includes the positioning information, and the positioning information is formed by an almanac (astronomical ephemeris), an ephemeris (broadcast ephemeris) and the like. The almanac represents information relating to approximate positions of satellite orbits including those of other GNSS satellites 1, and the ephemeris represents information including information relating to a detailed position of the satellite orbit of the GNSS satellite 1 that transmits the satellite signal.

The runner's watch 10 receives and maintains the almanac in advance, and recognizes the GNSS satellites 1 (may be referred to as visible satellites) that travel in the sky over the runner's watch 10 from the almanac, an approximate position of the runner's watch, and an approximate current time thereof. The runner's watch 10 selects a satellite to be used for positioning from the recognized GNSS satellites 1. Further, the runner's watch 10 receives and maintains the ephemeris in advance, and may obtain accurate position information of the GNSS satellite 1 that transmits the satellite signal from the ephemeris and the accurate time information obtained from the satellite signal during reception.

The almanac and the ephemeris have an effective life capable of being used as accurate information. For example, the effective life of the almanac is about several days, and the effective life of the ephemeris is about several hours. The almanac and the ephemeris of which the effective life is not expired are necessary for the position calculation. When the effective life is expired, it is necessary to receive a satellite signal from the GNSS satellite 1 to obtain the almanac and the ephemeris again.

Further, the transmission speed of the navigation message included in the satellite signal is converted into a data transmission speed of about 50 bits per second (bps) in a slow example, and thus, considerable time is necessary until the almanac or the ephemeris is obtained. The almanac includes approximate positions or the like of other GNSS satellites 1, and thus, has a large amount of information compared with the ephemeris. For example, in the runner's watch 10, about 20 seconds are necessary for obtaining the almanac, and about 10 seconds are necessary for obtaining the ephemeris.

1-5. Positioning Start Process: Hot Start, Warm Start, Cold Start

The user wears the runner's watch 10, and requests the runner's watch 10 of the positioning start when the position information of the user is necessary. Specifically, the time when a character string indicating the positioning start is displayed in the display section 60 and an operation button is pushed corresponds to the request of the positioning start. If the positioning start is requested, power of the receiving section that receives the satellite signal is turned on, and retrieval of the plural GNSS satellites 1 necessary for the position calculation of the runner's watch 10 is started. The display section 60 displays a display screen indicating that the GNSS satellites 1 are being retrieved. Further, when the plural GNSS satellites 1 are captured so that the position information can be output, the display section 60 displays a position information measurement screen (for example, chronographic measurement screen). In this state, if the operation button is pushed, measurement is started, and operations of displaying a movement distance, an elapsed time, a movement speed, and the like in the display section 60, and of recording the measurement result in the storage section are repeated. A time from the push of the operation button for the request of the positioning start to the display of the chronographic measurement screen corresponds to TTFF (Time to First Fix).

In the runner's watch 10, the display of the positioning calculation, the position information or the like is continued until a positioning end instruction is given by the user.

For example, it is assumed that the user is under the following situations. In a state where the user wears the runner's watch 10 on the wrist, the user pushes the operation button for requesting the positioning start immediately before starting running. Then, the runner's watch 10 sequentially displays a running distance, a running speed, and the like as the position information per unit time (for example, every one second to four seconds), and informs the user of the result. If the running is finished, the user pushes the operation button indicating a positioning end. The runner's watch 10 finishes the positioning, and transits to a clock display or the like.

In the runner's watch 10, when the positioning start is requested by the user, the start process is switched according whether the almanac and the ephemeris of which the effective life is not expired is maintained. This is because when the almanac and the ephemeris of which the effective life is not expired are not maintained, a process of obtaining (receiving) the almanac and the ephemeris of which the effective life is not expired is necessary.

The positioning start process of the runner's watch 10 includes a hot start, a warm start, and a cold start, which are selected according to a maintained state of the positioning information at the positioning start.

The hot start is a start process in a state where the effective almanac and ephemeris are maintained. In this case, initial position information is calculated in several seconds (for example, one second to three seconds) from the positioning start. In the hot start, the satellite signals are received from four or more specified GNSS satellites 1, and the position of the runner's watch 10 is calculated from signal propagation times, accurate time information and accurate positions of the GNSS satellites 1. The user may confirm the initial position information in several seconds from the push of the button for the request of the positioning start.

The warm start is a start process in a state where the effective almanac is maintained, but the effective ephemeris is not maintained. If the positioning is started, the satellite signals are received from the GNSS satellites 1 to obtain the ephemeris. In the runner's watch 10, about 10 seconds are necessary for the warm start process. That is, the user waits for about 10 seconds until confirming the initial position information from the push of the button indicating the positioning start.

The cold start is a start process in a state where neither of the effective almanac nor the effective ephemeris is maintained. If the positioning is started, the visible satellites are retrieved. If a suitable GNSS satellite 1 is found, the almanac is obtained. Then, the same process as in the warm start is performed. In the process of the cold start, about 20 seconds to several minutes may be necessary. That is, the user may wait for about 20 seconds or more until confirming the initial position information from the push of the button indicating the positioning start.

Among the three types of positioning start processes, the hot start can provide the position information to the user in the shortest time after the positioning start, and also can provide the shortest TTFF. In the runner's watch 10, a technique for increasing the frequency of the hot start at the positioning start is provided. That is, a possibility that the positioning information (almanac and ephemeris) of which the effective life is not expired at the positioning start is maintained is high.

2. METHOD FOR OBTAINING POSITIONING INFORMATION

2-1. Flow Up to Positioning Start

Next, a method for obtaining the positioning information up to the positioning start will be described.

FIG. 2 is a diagram illustrating processes up to the positioning start in a time series manner.

A time axis t represents an elapsed time, in which time elapses from a left side to a right side in an arrow direction. Respective states of signal transmission V, state change detection C, signal reception R, and positioning start S are performed from the left side in a time series manner.

Time St of the positioning start S represents a time when the user requests the positioning start to obtain the user's own position information. The effective life L refers to a time of the effective life of the positioning information. In the case of the ephemeris, the effective life L is several hours (for example, one hour), and in the case of the almanac, the effective life L is one day (for example, 24 hours). The signal transmission V represents a state where the satellite signal is transmitted from the GNSS satellite 1, and signal transmission time Vt refers to the transmission time of the oldest positioning information that is still effective when the user requests the positioning start S. The signal transmission time Vt is obtained by subtracting the effective life L from the positioning start time St. At the positioning start S, the positioning information after the signal transmission time Vt can be used for calculation of the position information, but correct position information cannot be calculated by the positioning information prior to the signal transmission time Vt.

The signal reception R represents a state where the satellite signal is received to obtain the positioning information, and signal reception time Rt refers to a time when the positioning information is obtained by the signal reception R.

The state change detection C represents a state where a state change of the runner's watch 10 is detected. The state change includes a change of a leaving or non-leaving state of the runner's watch 10, a change of a maintenance place from the indoor to the outdoor, a change of an operation state by the user, a change of a mounted state in the user, or the like. A time when each state change is detected refers to state change detection time Ct.

As the processes up to the positioning start, the signal transmission V from the GNSS satellite 1 and the state change detection C of the runner's watch 10 are received, and then, the signal reception R is executed. The positioning start S is executed using the positioning information obtained by the signal reception R. Since the positioning information is within the period of the effective life L, the positioning start S is started in the hot start.

2-2. Method for Receiving Satellite Signal from State Change

The runner's watch 10 should succeed in the signal reception R between the time Vt of the signal transmission V and the time St of the positioning start S to obtain the positioning information. However, in the signal reception R, the runner's watch 10 may fail in the reception of the satellite signal. For example, when the runner's watch 10 is positioned in an indoor place that the satellite signal does not reach, the runner's watch 10 fails in the reception of the satellite signal. In an actual use, since the user is indoors most of the time, even though the runner's watch 10 attempts to receive the satellite signal at an arbitrary time, the possibility of succeeding in the reception is low.

Thus, in the runner's watch 10, in order to capture an opportunity to succeed in the reception of the satellite signal, the state change of the runner's watch 10 is used. Specifically, since the runner's watch 10 is worn by the user to be moved or operated, by detecting the state change, it is possible to recognize that there is a possibility that the runner's watch 10 transits to an environment (outdoors or the like) capable of receiving the satellite signal.

FIG. 3 is a diagram illustrating an example of a state change due to operation, and FIG. 4 is a diagram illustrating an example of a state change due to a sensor.

As shown in FIG. 3, as the state change relating to the operation of the user, "power-on" "home screen switching", "communication end", "charging end", "charging start" or the like are written as respective items of "state change target", and "detection method" and "additional condition" of the respective items of the "state change target" are written in columns on the right side. For example, when the "state change target" is the "power on", the "detection method" is the "power button detection", and the "additional condition" is the "one minute after" or the "five minutes after", after one minute or five minutes from the time when the power button is pushed to turn on the power, the state change is detected. The detection of the state change corresponds to the state change detection C (FIG. 2), and the state change detection time Ct corresponds to a time after one minute or five minutes from the time when the power is turned on.

An item in which the "state change target" is the "charging start" has a different purpose from those of the other state changes. Since the charging is already started, the power is being supplied, and thus, it is not necessary to be conscious of power saving of the driving power for receiving the satellite signal. Rather, for example, a state where the satellite signal is received while performing charging by an indoor window or the like may be assumed, and it is convenient if the reception succeeds in this state. Thus, the "charging start" is defined.

Further, FIG. 4 shows state changes detected based on output information from an acceleration sensor, a wearing pressure sensor, and an illuminance sensor provided in the runner's watch 10 (details about the various sensors will be described later). In "acceleration" written as the "state change target", a movement distance is calculated using acceleration data, and the state change is detected when the calculated distance reaches "5 m" and "10 m". In "wearing pressure", a pressure force generated when the runner's watch 10 is worn on the arm is measured to detect the state changes of "wearing" and "detached". In "illuminance", the illuminance of sunlight or the like is measured, and the intensity of the illuminance is output as a digital value, so that the state change is detected for each numerical value. The intensity of the illuminance is a value of which the gain is controlled in the range of 0 to 255, which corresponds to "50 (indoor)", "100 (outdoor and cloudy)", and "200 (outdoor and fine)".

Since a circuit that detects sensor signals is driven even though the power of the runner's watch 10 is in a turned-off state or a sleep (standby) state, the various sensors are capable of detecting the variety of sensor data.

The detection of the state change using the various sensors corresponds to the state change detection C (FIG. 2).

The state change detection C is derived by statistically analyzing the correlation between various detection data stored by an experimental model in advance and environmental changes. For example, in detection of a movement distance of 10 m based on the "acceleration", since the one-time movement distance is 10 m, a case where the movement is performed from the indoor to the outdoor may be assumed. Even in the statistical data, a reception success rate of the satellite signal of the GNSS satellite 1 increases after the movement compared with before the movement.

2-3. Satellite Signal Reception Control Process

In order to perform the hot start at the time of the positioning start S, it is sufficient if the positioning information in which the effective life is not expired can be obtained. However, if a predetermined state change detection C occurs plural times in a short time, the satellite signal is received by the same number of times. In order to suppress power consumption necessary for the reception process, it is preferable to reduce the number of receptions.

Thus, in the runner's watch 10, the execution of the satellite signal reception process is suppressed, and the number of receptions of the satellite signal is controlled to the necessary minimum. Specifically, when the state change detection C is received and the execution request of the signal reception R is present, it is determined whether to receive the execution of the signal reception R by comparison with a predetermined suppressing condition.

FIG. 5 is a diagram illustrating an example of the reception suppressing condition. An example of the first line shows a suppressing condition that the execution of the satellite signal reception process is suppressed (not received) for "60 minutes" from the "previous ephemeris obtainment success". This suppressing condition represents that a new satellite signal reception process is not performed even though the predetermined state change detection C occurs during the time when the ephemeris of which the effective life is not expired is maintained.

Further, "during reception" in the second line represents that the satellite signal is being currently received, and "during positioning" in the third line represents that the positioning is being performed while the satellite signal is being received. Since the "during reception" and the "during positioning" represent that the satellite signal reception process is being performed, the new satellite signal reception process is not performed.

In this way, by using the predetermined suppressing condition, the number of the satellite signal reception processes is suppressed to the necessary minimum even though the predetermined state change detection C occurs plural times in a short time.

With respect to the obtainment of the almanac, since the effective life of the almanac is long compared with the ephemeris, the almanac may be obtained as necessary in an opportunity to receive the satellite signal for obtaining the ephemeris.

2-4. Satellite Signal Reception Timing

As described above, a timing when the signal reception process is performed using the state change detection and the satellite signal is received by the reception suppressing process is controlled.

Figure 6:
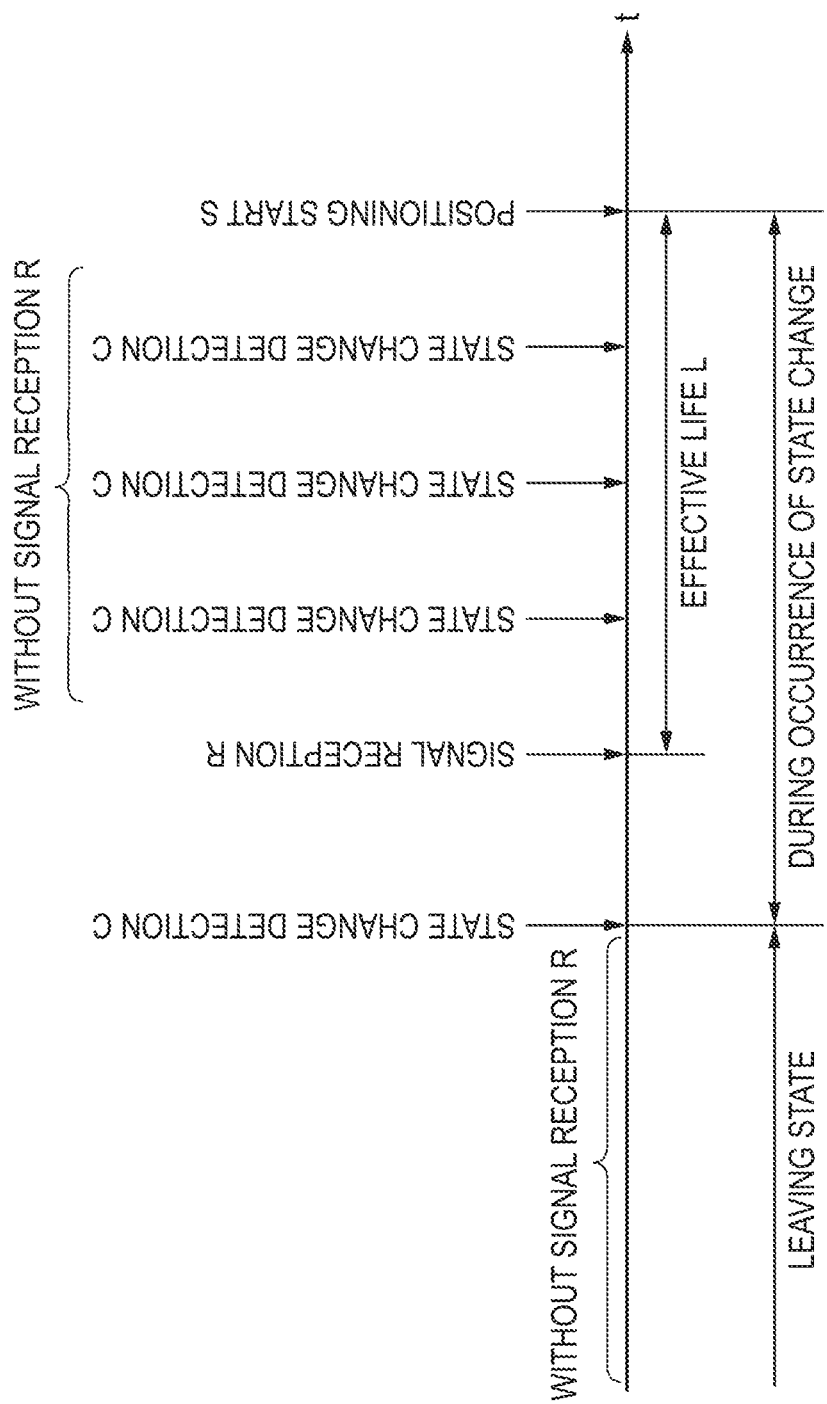
FIG. 6 is a diagram illustrating an execution timing of signal reception.

FIG. 6 is a diagram illustrating a signal reception execution timing.

A time axis t represents elapsed time, similar to FIG. 2. A first half on the time axis (left side from the state change detection C) represents a time zone of a leaving state of the runner's watch 10, and a second half represents a time zone where a state change frequently occurs using the state change detection C as a trigger. This state shows a typical behavior of a user who makes a point of running or the like. For example, a state where the runner's watch 10 is placed on a desk or the like in a room corresponds to the leaving state. A timing when the user wears the runner's watch 10 for running corresponds to the state change detection C. A time between the state change detection C that is a boundary and a running start corresponds to a state where behaviors such as a running preparation, an operation of the runner's watch 10, a movement with the runner's watch 10 being worn, and a stretching motion are repeated, which is in the middle of the state change.

In the leaving state, since the watch is left until at least the effective life of the ephemeris is expired and the state change detection is not generated, the signal reception R is not executed. For example, if the user wears the runner's watch 10 and the wearing is detected by the wearing pressure sensor, the state change detection C is generated. If the satellite signal reception process is requested, it is confirmed that the effective life of the positioning information is expired, and the signal reception R is executed. After succeeding in the signal reception R and obtaining the positioning information, during the time when the state change detection C is frequently generated but the positioning information of which the effective life L is not expired is maintained by the suppressing condition, the new signal reception R is not executed. At the timing of the positioning start S, in a state where the positioning information of which the effective life is not expired is maintained, if the signal reception R based on the first state change detection C succeeds, the satellite signal reception process for obtaining the positioning information may be realized by one-time reception.

2-5. Comparison with Related Art Method and Effects of the Present Embodiment In a related art method for performing a satellite signal reception process on the time axis, when an electronic device is left on a desk or the like in a room for a long time, the reception process is continuously performed every predetermined time. Here, when the reception succeeds, even though positioning information is not used, the reception process is repeated every predetermined time so that the positioning information is repeatedly obtained. Further, when the reception fails, the reception failure is repeated every predetermined time while an environment that affects the reception of the satellite signal is not changed.

In the method for performing the reception process based on the state change detection C according to the present embodiment, as shown in FIG. 6, if the runner's watch 10 is in the leaving state, since the state change detection C does not occur, the reception process is not performed. Thus, the obtainment of the positioning information that is not used and the reception failure as in the related art method are not repeated.

Further, if the user wears the runner's watch 10, the wearing is detected by the state change detection C, and the signal reception R is executed. Since the detection condition of the state change detection C is a condition having a high possibility that the reception succeeds in a state where the state change is captured (FIGS. 3 and 4), the success rate by means of the execution of the signal reception R tends to increase. If the signal reception R is executed and succeeds, since a new reception process is not performed during the time when the effective life is not expired by the reception suppressing condition (FIG. 5), the number of the reception processes is controlled to the necessary minimum.

Accordingly, according to the present embodiment, by reducing the number of the reception processes before the positioning start, power consumption is reduced, the positioning information of which the effective life is not expired at the positioning start is maintained, and reduction in TTFF is realized.

3. FUNCTIONAL CONFIGURATION OF RUNNER'S WATCH

Figure 7:
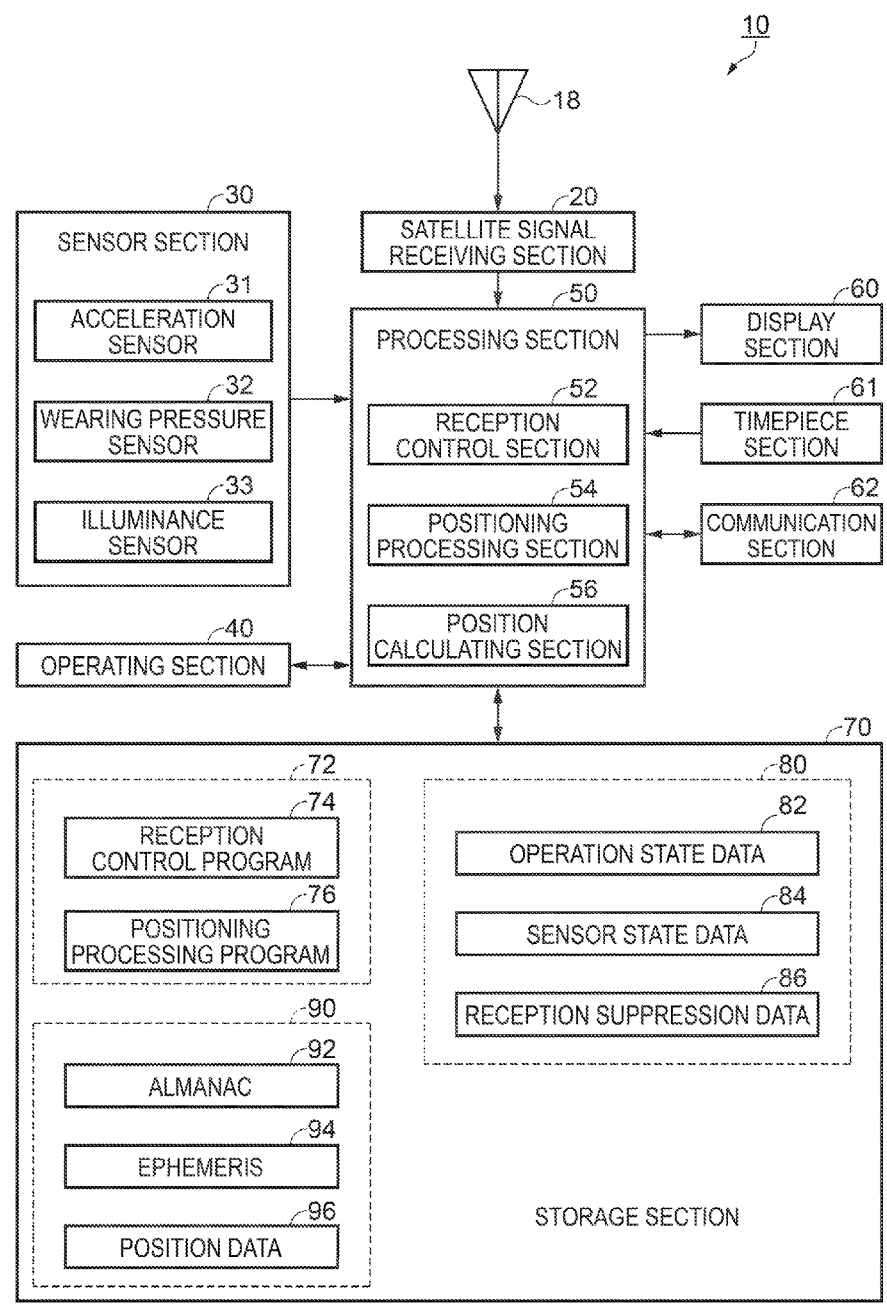
FIG. 7 is a block diagram illustrating an example of a functional configuration of a runner's watch.

FIG. 7 is a block diagram illustrating an example of a functional configuration of the runner's watch. The runner's watch 10 includes an antenna 18, a satellite signal receiving section 20, a sensor section 30, an operating section 40, a processing section 50, a display section 60, a timepiece section 61, a communication section 62, a storage section 70, and the like.

The antenna 18 is an antenna that receives a radio frequency (RF) signal including a satellite signal transmitted from the GNSS satellite 1. The received signal is output to the satellite signal receiving section 20.

The satellite signal receiving section 20 that is a receiving section is configured in the form of large scale integration (LSI) including an RF reception circuit, a baseband module, and the like, and extracts and obtains information relating to positioning overlapped with the RF signal input through the antenna 18. Specifically, the satellite signal receiving section 20 performs signal processing for the input RF signal to capture a satellite signal of the GNSS satellite 1. The satellite signal receiving section 20 separates a navigation message overlapped with the captured satellite signal to obtain the positioning information included in the navigation message. The positioning information includes an almanac or an ephemeris. The almanac or the ephemeris is converted into digital data, and is output to the processing section 50. Further, the received satellite signal includes information about an accurate transmission time when the satellite signal is transmitted from the GNSS satellite 1 and a radio wave propagation delay when the satellite signal is received. Then, a pseudo distance between the GNSS satellite 1 and the runner's watch 10 is calculated. The positioning information, the calculated pseudo distance, and the like are used by various processing programs of the processing section 50, and are stored in the storage section 70 as position data 96.

The satellite signal receiving section 20 has a function of receiving various commands or protocols and executing corresponding processes. For example, the satellite signal receiving section 20 may individually execute functions such as almanac reception, ephemeris reception, almanac and ephemeris reception, and positioning start. The various commands or protocols are issued from various processing programs of the processing section 50.

The above-described processes performed in the satellite signal receiving section 20 correspond to a reception process.

The sensor section 30 includes an acceleration sensor 31, a wearing pressure sensor 32, an illuminance sensor 33, and the like.

The acceleration sensor 31 is a triaxial acceleration sensor capable of detecting accelerations in directions of three axes (X axis, Y axis, and Z axis) that are approximately orthogonal to each other. The acceleration sensor 31 measures acceleration changes of the respective axes at every sampling interval. As a preferable example, the sampling interval is set to 16 Hz or more. The acceleration sensor 31 detects the motion of the user, AD (Analog to Digital)-converts the detected acceleration signal, and outputs the acceleration data to the processing section 50. In the various processing programs of the processing section 50, the step length of the user who wears the runner's watch 10 can be estimated by integrating the stored acceleration data, and movement information including a movement speed and a movement distance can be calculated using the estimated value and the like.

The acceleration sensor 31 is a sensor unit that includes the triaxial acceleration sensor, but may be a sensor unit that includes a sensor that measures accelerations in directions of at least two axes. A sensor that measures accelerations in directions of two axes that are approximately orthogonal to each other may be provided, or a sensor that measures accelerations in directions of four or more axes that intersect with each other in three-dimension may be provided.

The wearing pressure sensor 32 is a pressure sensor that is disposed on a surface of the runner's watch 10 being in contact with the arm of the user to detect physical pressure. The wearing pressure sensor 32 AD-converts a pressure signal obtained by detecting wearing state information including a state where the runner's watch 10 is worn on the arm and a state where the runner's watch 10 is detached from the arm, and outputs the result to the processing section 50 as pressure data. In the various processing programs of the processing section 50, the state change of the wearing and the detachment can be captured from the change of the pressure data.

The wearing pressure sensor 32 is a sensor unit that detects the physical pressure, but may be a sensor unit that detects the wearing state with a different structure, such as a pulse wave sensor unit that includes a photoelectric pulse wave sensor on an arm contacting surface to detect a pulse wave, or a sensor that is provided with a terminal that allows a weak current to flow in the arm contacting surface to detect the current flow state.

The illuminance sensor 33 is an illuminance sensor that is disposed on the surface of the runner's watch 10 on the side of the display section 60 and detects the intensity of light of an external environment. As a preferable example, the illuminance sensor 33 is a photo integrated circuit (IC) that includes a photo diode. The illuminance sensor 33 detects the illuminance every wavelength of visible light, and mainly captures change in the outdoor illuminance from the indoor illuminance. The illuminance detected from the illuminance sensor is AD-converted, and is output to the processing section 50 as environmental illuminance information including the illuminance data. In the various processing programs of the processing section 50, information indicating that there is a high possibility of the movement from the indoor to the outdoor can be obtained from the change in the illuminance data.

The illuminance sensor is the photo IC that includes the photo diode, but the invention is not limited thereto. For example, a photo IC having a photo transistor or the like may be used. Further, a solar module that includes a solar battery used as one type of means for power supply to the runner's watch 10 may be used. The solar module is provided on the surface of the runner's watch 10 on the side of the display section 60, and converts irradiation light energy into power for the power supply. In this process, the amount of output electric energy is detected and is AD-converted, and the AD-converted electric energy data is used as data corresponding to the illuminance.

The operating section 40 is an input device such as an operation button or a touch panel that is operated by the user, or a charging terminal, in which an input signal and information indicating a state transition at the time of input are output to the processing section 50. The operating section 40 outputs a detection result based on the "detection method" for the "state change target" shown in the figure (FIG. 3) that illustrates the example of the state change due to the operation to the processing section 50. Next, the process of the operating section 40 for each "state change target" shown in FIG. 3 is specifically described.

The "power on" represents that the power is turned on by a long press (3 to 4 seconds) of the operation button in the power off state. The operating section 40 detects the state change in which the power is changed to on from off, and informs the processing section 50 of the state change.

The "home screen switching" represents that the screen is switched to a home screen as the operation button is pressed once in a state where the transited screen is not the home screen. The operating section 40 detects the state change in which the screen is switched to the home screen, and informs the processing section 50 of the change state.

The "communication end" represents a state change in which stored position data or the like of the user is transmitted to another personal computer (PC) in short-range wireless communication and the transmission communication is finished. Alternatively, the "communication end" represents a state change in which data is transmitted to the runner's watch 10 from an external device such as a PC and the transmission communication is finished. The operating section 40 detects the state change in which the communication is finished, and informs the processing section 50 of the state change.

In the "charging end", a state where a terminal that has charged a power source (secondary battery) of the runner's watch 10 is detached by the user is detected. Alternatively, in the case of contactless charging, a timing when the charging supply is expired is detected. The operating section 40 detects the state change of the charging end, and informs the processing section 50 of the state change.

In the "charging start", a state where the charging of the power source starts by an operation of the user for connection of the power source terminal is detected. The operating section 40 detects the state change of the charging start, and informs the processing section 50 of the state change.

The processing section 50 is a processor such as a micro processing unit (MPU) or a digital signal processor (DSP), and generally controls the respective functional sections of the runner's watch 10 based on the various programs including the reception control program 74 and the positioning processing program 76 stored in the storage section 70.

The processing section 50 includes a reception control section 52, a positioning processing section 54, and a position calculating section 56 as main functional sections.

The reception control section 52 that is a control section is a functional section that is realized as the reception control program 74 stored in the storage section 70 is executed by the processing section 50, realizes the reception timing (FIG. 6) of the above-described satellite signal, and receives the satellite signal to obtain the positioning information (almanac and ephemeris). In the reception control section 52, a detecting section that detects the state change based on the detection result due to the sensor and the operation output from the sensor section 30 and the operating section 40 is included. The details of the process of the reception control section 52 will be described later.

The positioning processing section 54 is a functional section that is realized as the positioning processing program 76 stored in the storage section 70 is executed by the processing section 50, receives a positioning start request from the user, and starts the positioning. Specifically, one visible satellite is captured among the GNSS satellites 1 to receive a satellite signal. The pseudo distance between the GNSS satellite 1 and the runner's watch 10 is calculated from the information about the accurate transmission time of the received satellite signal and the radio wave propagation delay at the time of reception is calculated. The process of the positioning processing section 54 will be described later.

If the process of the positioning processing section 54 is repeated for four or more GNSS satellites 1, the position calculating section 56 performs position calculation from the pseudo distance between the respective GNSS satellites 1 and the runner's watch 10 to calculate the position information about the runner's watch 10. Further, the position calculating section 56 calculates a movement distance or a movement speed using the position at the time when the positioning starts as a starting point, based on the calculated position information.

The display section 60 is a display device that includes a liquid crystal display (LCD), an LCD drive circuit (driver) or the like, and displays a display bitmap data output based on the screen transition specification from the processing section 50.

The timepiece section 61 is a real-time clock of the runner's watch 10, and includes a quartz crystal oscillator including a quartz crystal vibrator and a transmission circuit. The time of the timepiece section 61 is frequently output to the processing section 50. The time of the timepiece section 61 is corrected based on a timepiece error calculated by the satellite signal receiving section 20 and the processing section 50, using the satellite signal received from the GNSS satellite 1.

The communication section 62 performs the short-range wireless communication between the runner's watch 10 and the PC 10 or the like, and transmits the position data or the like of the user stored in the runner's watch 10 to the PC or the like. Further, the communication section 62 also has a function of receiving various information or map information relating to the GNSS satellite 1, or version-up information or the like of the control program of the runner's watch 10.

The communication section 62 may include a physical communication terminal, and may be connected to the PC or the like through a cable to transmit and receive the position data or the like.

The storage section 70 includes a storage device such as a read only memory (ROM), a flash ROM, or a random access memory (RAM), in which a program 72, data 80, output data 90, and the like are stored by the processing section 50.

The program 72 corresponds to a program for controlling the runner's watch 10 and various application programs, and includes the reception control program 74, the positioning processing program 76, and the like. The process of the reception control program 74 and the positioning processing program 76 will be described later.

The data 80 is data necessary for executing the program 72, and includes operation state data 82, sensor state data 84, reception control data 86, and the like. The operation state data 82 is obtained by respectively digitalizing an example 82a (FIG. 3) of the state change due to the operation and the sensor state data 84 is obtained by respectively digitalizing an example 84a (FIG. 4) of the state change due to the sensor. The reception control data 86 is obtained by respectively digitalizing an example 86a of reception suppressing condition (FIG. 5).

The output data 90 is data output by execution of the program 72, in which an almanac 92 and an ephemeris 94 are stored as the positioning information obtained from the satellite signal and position data 96 or the like is stored as the calculated positioning information.

4. RECEPTION CONTROL FLOW OF RUNNER'S WATCH

Figure 8:
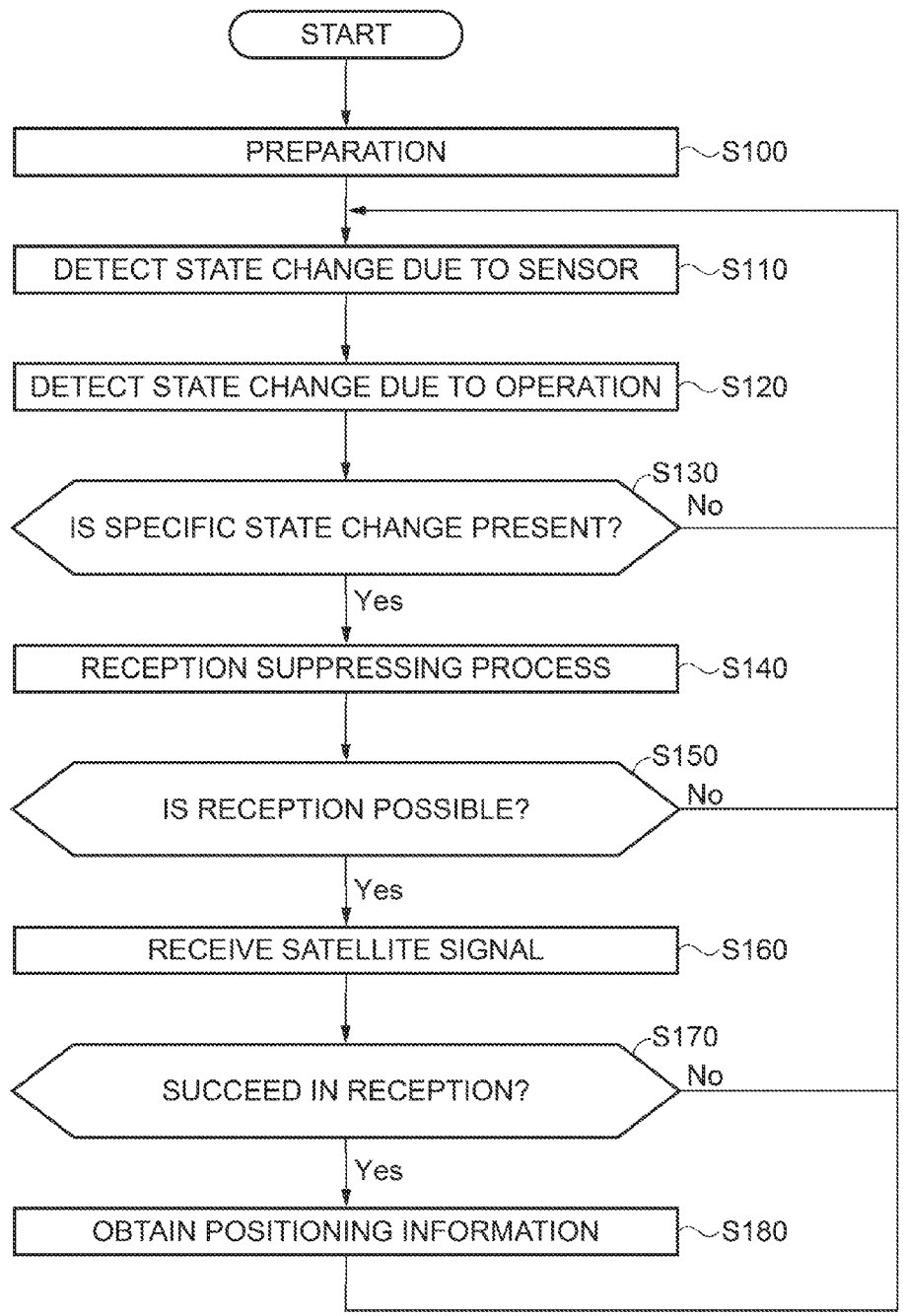
FIG. 8 is a flowchart illustrating the flow of a reception control process.

FIG. 8 is a flowchart illustrating the flow of the reception control process. Hereinafter, the description will be made with reference to the respective drawings including FIG. 8 as a representative drawing. The following flow is a flow that is executed as the processing section 50 controls the respective sections that form the runner's watch 10 based on the reception control program 74 of the storage section 70 shown in FIG. 7, which realizes the function of the reception control section 52. The following steps S100 to S180 correspond to a control process.

In step S100, a preparation for the reception control is performed. Specifically, a timer is set using the real-time clock of the timepiece section 61 (see FIG. 7). The timer sets at least a sampling time used in the sensor section 30 including the acceleration sensor 31, the wearing pressure sensor 32, and the illuminance sensor 33, and the time of the additional condition defined by the operation state data 82, the sensor state data 84, and the reception control data 86 stored in the storage section 70.

Further, in step S100, the sensor section 30 is driven to start detection every sampling time. Even though the power of the runner's watch 10 is in the turned-off state or the sleep (standby) state, the sensor section 30 drives the circuit that detects the sensor signal, and outputs the detected data.

In step S110, the state change due to the sensor is detected. Specifically, the detection data output from the acceleration sensor 31, the wearing pressure sensor 32, and the illuminance sensor 33 is compared with the detection method and the additional condition shown in the sensor state data 84 (FIG. 7) (the example 84a of the state change due to the sensor (FIG. 4)). Specifically, in the "acceleration" shown in FIG. 4, acceleration data in a specific direction is integrated to calculate the movement distance. The calculated movement distance is compared with the distance of the additional condition. In the "wearing pressure", the wearing and detachment are detected from a change point of pressure data and a pressure difference between before and after the change point. In the "illuminance", an average of AD-converted illuminance data per unit time is calculated, and the calculated average value is compared with a value (digital value) of the additional condition.

The comparison result through each sensor is determined in step S130.

In step S120, the state change due to the operation is detected. Specifically, if the operation state data 82 and the detection notification of the operation of the detection method shown in the example 82a (FIGS. 7 and 3) of the state change due to the operation are received from the operating section 40 (FIG. 7), the timer for measuring the time shown in the additional condition starts. When the time of the timer reaches the time shown in the additional condition, the state change is detected.

In step S130, it is determined whether the state change occurs. Specifically, in steps S110 and S120, when the state change due to the sensor or the state change due to the operation are detected (Yes), the procedure goes to the next step S140, and when the state change due to the sensor and the state change due to the operation are not detected (No), the procedure returns to step S110.

Steps S110 to S130 correspond to a detection process.

In step S140, the reception control process is performed. Specifically, in order to determine whether to execute the reception process of the satellite signal, it is confirmed whether the current state corresponds to the state of the reception control data 86 and the suppression target and the additional condition shown in the example 86a (FIGS. 7 and 5) of the reception suppressing condition. Specifically, with respect to the "previous ephemeris obtainment success", the time elapsed after the latest ephemeris 94 (FIG. 7) stored in the storage section 70 is received is obtained. If the elapsed time exceeds 60 minutes, an internal flag indicating an ephemeris reception necessity state is raised (ephemeris reception is necessary). Further, in the almanac, the elapsed time is obtained based on the latest almanac 92 (FIG. 7), and if the effective life of the almanac is expired, an internal flag indicating an almanac reception necessity state is raised (almanac reception is necessary).

Next, in the "during reception" and the "during positioning", if the satellite signal receiving section 20 (FIG. 7) receives the satellite signal, or during the positioning, the internal flags indicating the ephemeris and almanac reception necessity states are lowered (neither ephemeris nor almanac is necessary).

The internal flags indicating the ephemeris and almanac reception necessity states are local variables that are common to the respective steps of steps S140 to S160, and in an initial process (before the above-described flag operation) in step S140, the both internal flags are reset (lowered).

In step S150, it is determined whether the satellite signal reception is available. Specifically, the comparison and determination are performed based on the internal flags set in step S140. When the internal flag indicating the ephemeris or almanac reception necessity state is raised, it is determined that the reception is available (Yes), the procedure goes to step S160, and when both the inner flags indicating the ephemeris and almanac reception necessity states are lowered, it is determined that the reception is not available (No), and the procedure returns to step S110.

In step S160, the satellite signal reception process is executed. Specifically, first, the RF reception circuit and the LSI of the satellite signal receiving section 20 (FIG. 7) are driven. That is, the power of the receiving section that receives the satellite signal is turned on. Then, a command corresponding to the positioning information of which the obtainment is necessary in the determination of steps S140 and S150 is transmitted to the satellite signal receiving section 20. For example, when both of the ephemeris and the almanac can be received, a command for receiving the ephemeris and the almanac is transmitted, and when only the ephemeris can be received, a command for receiving the ephemeris is transmitted.

The execution of the satellite signal reception process in step S160 corresponds to a start process of the reception process. The reception process corresponds to the above-described reception process of the satellite signal receiving section 20.

In step S170, it is determined whether the reception succeeds. If the visible satellite signal can be captured from the GNSS satellite 1 according to the response of the command from the satellite signal receiving section 20 in the satellite signal reception in step S160 so that the satellite signal can be received (Yes), the procedure goes to step S180. When the capturing of the visible satellite signal fails (No), the procedure returns to step S110, and waits for occurrence of the next state change.

In step S180, the positioning information is obtained. Specifically, the ephemeris or the almanac extracted from the satellite signal received in step S160 is obtained from the satellite signal receiving section 20, and is stored as the almanac 92 and the ephemeris 94 of the storage section 70.

If the positioning information is completely obtained, the driving of the RF reception circuit and the LSI of the satellite signal receiving section 20 is stopped. Then, the procedure returns to step S110, and repeats the next state change detection.

5. POSITIONING PROCESS FLOW OF RUNNER'S WATCH

Figure 9:
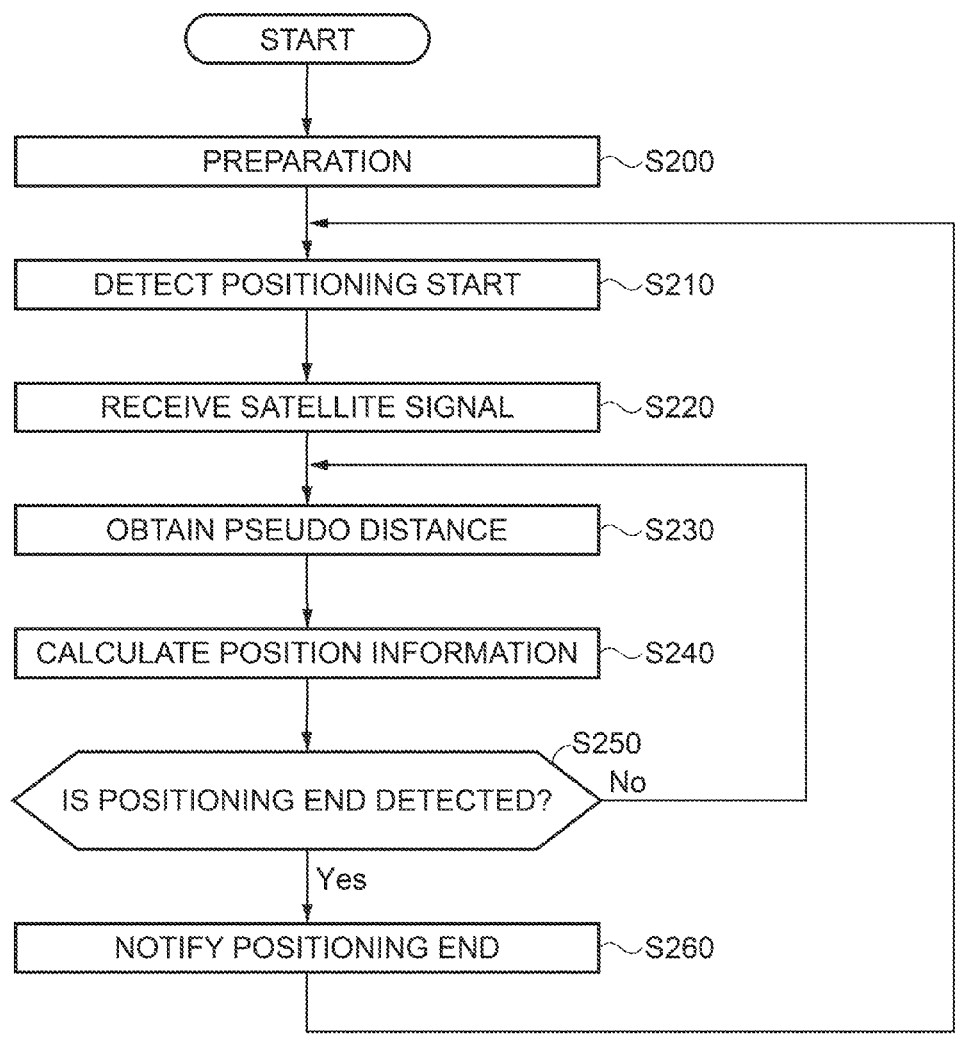
FIG. 9 is a flowchart illustrating the flow of a positioning process.

FIG. 9 is a flowchart illustrating the flow of the positioning process. Hereinafter, the description will be made with reference to the respective drawings including FIG. 9 as a representative drawing. The following flow is executed as the processing section 50 controls the respective sections that form the runner's watch 10 based on the positioning processing program 76 of the storage section 70 shown in FIG. 7, which realizes the function of the positioning processing section 54.

In step S200, the preparation for the positioning process is performed. Specifically, after the reception control program 74 (FIG. 7) is executed, the information about the latest almanac 92 and ephemeris 94 stored in the storage section 70 is taken as a local variable or a common variable to be used in the program.

In step S210, the positioning start is detected. Specifically, it is confirmed whether the positioning start is requested by the user through the operating section 40 (FIG. 7). Specifically, the positioning start is detected at a timing when the user pushes the operation button in a state where the "start" menu indicating the positioning start displayed in the display section 60 (FIG. 7) is selected. After the positioning start is detected, the procedure goes to the next step S220.

In step S220, the satellite signal reception process is executed. Specifically, first, the RF reception circuit and the LSI of the satellite signal receiving section 20 (FIG. 7) are driven. Then, the information about the latest almanac 92 and ephemeris 94 is transmitted to the satellite signal receiving section 20, to issue a positioning start request command. If the positioning start request command is received, the satellite signal receiving section 20 captures at least four or more visible satellites and satellite signals thereof based on the information about the almanac 92.

In step S230, the pseudo distance is obtained. Specifically, since the positioning start request command is issued to the satellite signal receiving section 20 in step S220, thereafter, the satellite signal receiving section 20 receives the captured satellite signal, and continues the calculation of the pseudo distance using the obtained positioning information. In step S230, the pseudo distances that are sequentially calculated in the satellite signal receiving section 20 are obtained.

In step S240, the position information is calculated. Specifically, a known position calculation process is performed using the pseudo distance information obtained from at least four visible satellites to calculate the position of the runner's watch 10.

In step S250, it is determined whether the positioning end is detected. Specifically, it is confirmed whether the positioning end is instructed by the user through the operating section 40 (FIG. 7). When the push of the operation button indicating the positioning end is detected (Yes), the procedure goes to step S260, and when the push of the operation button indicating the positioning end is not detected (No), the procedure returns to step S230 to continue the obtainment of the pseudo distance.

In step S260, the positioning end is notified. Specifically, the positioning end command is transmitted to the satellite signal receiving section 20. If the positioning end command is received, the satellite signal receiving section 20 stops the satellite signal reception, and stops the driving of the RF reception circuit and the LSI.

Then, the procedure returns to step S210.

The respective steps of steps S100 to S180 and steps S200 to S260, and the above-described process of the satellite signal receiving section 20 correspond to a reception control method.

6. EFFECTS OF RUNNER'S WATCH

As described above, according to the runner's watch 10 according to the present embodiment, the following effects can be obtained.

The runner's watch 10 includes the sensor section 30 and the operating section 40 (FIG. 7), detects the state change defined by the sensor state data 84 and the operation state data 82 to capture that there is a possibility that the runner's watch 10 transits to an environment in which the satellite signal can be received.

When such a state change is detected, the success rate of the satellite signal reception increases, compared with a case where the state change is not detected. If the satellite signal reception success rate increases, a possibility that the runner's watch 10 can maintain the positioning information (almanac and ephemeris) increases. Accordingly, when the positioning start is requested by the user, the possibility of the hot start increases, and an opportunity to decrease the TTFF increases.

Further, since the satellite signal reception process is not executed until the state change occurs, the satellite signal is not received during the time when the runner's watch is not used, for example, is in the leaving state. Accordingly, the useless reception process and positioning information obtainment such as the periodical reception process of the satellite signal on the time axis during the time when the runner's watch is not used, the obtainment of positioning information non-scheduled for use, and the repetition of the reception process failure, as in the related art, are not performed, and thus, the power consumption according to such a reception process is drastically reduced.

Further, when the reception suppressing condition for suppressing the satellite signal reception is satisfied, the receiving section does not enter the driving state. Accordingly, even through the detection of the state change frequently occurs, the necessary number of receptions is limited by the reception suppressing condition, and thus, the receiving section does not frequently enter the driving state, to thereby reduce the power consumption.

Accordingly, according to the runner's watch 10, it is possible to provide an electronic device in which the power consumption before the start of use is reduced and the TTFF is reduced at the start of use, and a control method for realizing the electronic device.

7. MODIFICATION EXAMPLES

Modification Example 1

Modification example 1 will be described with reference to FIG. 7.

In the above-described embodiment, a configuration in which the respective items of the state change target and the detection method that are defined in advance are stored as the operation state data 82 and the sensor state data 84 is described, but the invention is not limited to the configuration.

A configuration in which the processing section 50 adds a new item of the state change target and the detection method from a PC and a server through the communication section 62 to change the operation state data 82 and the sensor state data 84 may be used.

According to this modification example, since it is possible to add the state change target and the detection method that cannot be assumed in an initial stage to change the operation state data 82 and the sensor state data 84, it is possible to handle a new environment or a new behavior pattern, and to increase the reception success rate of the satellite signal.

Modification Example 2

FIG. 10 is a diagram illustrating an example of a state change according to Modification example 2.

In the above-described embodiment and modification example, the respective items of the state change target and the detection method are used in consideration of various use forms over a wide range of users as target, but may be used to be specific to users in consideration of use situations of the users.

FIG. 10 shows an example in which an item of P(R|C) is added to FIG. 3.

The P(R|C) is a numerical value that represents, as a percentage, successful reception records when the signal reception R is executed after the state change detection C occurs, which is a fraction calculated using the number of occurrence times of the state change detection C as a denominator, and using the number of successes when the signal reception R is executed after the state change detection C as a numerator. The size of the numerical value of P(R|C) represents the degree that the state change of the state change detection C depending on the behavior of the user is actually affected by the reception success. That is, if the state change detection C is a state change that hardly affects the reception success, there is a high possibility that the reception fails even though the reception process of the satellite signal is performed after the state change.

Specifically, in the determination process of step S130 in FIG. 8, when the state change detection C occurs, if the P(R|C) is equal to or greater than a predetermined frequency rate (for example, 0.15 or the like), the procedure goes to step S140, and if the P(R|C) does not exceed the predetermined frequency rate, the procedure returns to step S110.

According to the present modification example, even though the number of the state change detections C of the respective items of the state change target and the detection method increases, only the item of the state change detection C in which characteristics of the user's own life cycle or an exercise-related behavior are determined to execute and succeeds in the reception of the satellite signal. Thus, it is possible to further increase the reception success rate of the satellite signals, and to reduce the power consumption for driving the satellite signal receiving section 20.

The determination process due to the P(R|C) is described using "an example of the state change due to the operation", but may also be applied to "an example of the state change due to the sensor" (FIG. 4) in the same manner.

Modification Example 3

Modification example 3 will be described with reference to FIGS. 3 and 4.

In the above-described embodiments and modification examples, as shown in FIGS. 3 and 4, the signal reception R is executed for each item, but may be executed for a combination of plural items. For example, when both conditions are combined in the order of the "power-on" and the "illuminance", the state change detection C occurs under the condition of "if the illuminance exceeds 100 after the power is turned on", and the signal reception R is executed.

In this way, by referring to the reception success rate based on the combination of the plural state change targets, it is possible to determine a specific behavior pattern having a high reception success rate. Thereafter, if the signal reception R is executed after the specific behavior pattern is detected, it is possible to succeed in the reception with a high possibility.

Modification Example 4

In the above-described embodiments and modification examples, for a predetermined time before the effective life of the maintained positioning information is expired, the related art that receives the satellite signal from the GNSS satellite 1 to obtain the positioning information again may be used. Here, when the positioning information is obtained again every predetermined time (for example, automatic reception every hour), in a case where the state change is detected between the previous automatic reception and the current automatic reception the receiving section is operated to obtain the positioning information again, the current automatic reception may not be performed.

With such a configuration, even though the state change cannot be detected, since the operation of obtaining the positioning information again using each hour as a trigger, the TTFF is reduced at the time of the positioning start. Further, when the positioning information can be obtained again by the detection of the state change, since the current automatic reception is not performed, it is possible to reduce power consumption.

The entire disclosure of Japanese Patent Application No. 2013-215264, filed Oct. 16, 2013 is expressly incorporated by reference herein.

What is claimed is:

1. An electronic device comprising:
 a satellite signal receiver including a RF reception circuit that is configured to receive a satellite signal with which positioning information is overlapped from a positioning satellite;
 processor that is configured to control driving of the receiver, and detects a state change of the electronic device,
 wherein the state change being detected is a combination of a change in user operation and a change of state based on sensor information, and
 wherein the processor allows the satellite signal receiver to enter a driving state when the state change is detected, and a reception success rate of the satellite signal under the state change conditions exceeds a predetermined success rate.

2. The electronic device according to claim 1,
 wherein the change in user operation includes at least one of power-on of the electronic device, screen-switching of the electronic device, communication end of the electronic device, and charging start of the electronic device.

3. The electronic device according to claim 1,
 wherein the electronic device includes at least one of an acceleration sensor that outputs movement information of the electronic device, a wearing pressure sensor that outputs wearing state information of the electronic device, and an illuminance sensor that outputs environmental illuminance information of the electronic device, and
 wherein the sensor information includes at least one of the acceleration information, the wearing state information, or the environmental illuminance information.

4. The electronic device according to claim 1,
 wherein when the state change is detected and a reception suppressing condition for controlling reception of the satellite signal is satisfied, the processor does not allow the satellite signal receiver to enter the driving state.

5. The electronic device according to claim 1,
 wherein the positioning information includes ephemeris information and almanac information.

6. A reception control method executed by an electronic device that calculates position information of the electronic device, comprising:
 receiving a satellite signal with which position information is overlapped from a positioning satellite;
 controlling start and stop of the receiving; and
 detecting a state change of the electronic device,
 wherein the state change is a combination of a change in user operation and a change of state based on sensor information, and
 wherein the receiving is started to receive the satellite signal when the state change is detected, and a reception success rate of the satellite signal under the state change conditions exceeds a predetermined success rate.

* * * * *